United States Patent
Fan (10) Patent No.: US 9,315,914 B2
(45) Date of Patent: Apr. 19, 2016

(54) LIGHT METAL PRODUCTION

(71) Applicant: Qinbai Fan, Chicago, IL (US)

(72) Inventor: Qinbai Fan, Chicago, IL (US)

(73) Assignee: Gas Technology Institute, Des Plaines, IL (US)

( * ) Notice: Subject to any disclaimer, the term of this patent is extended or adjusted under 35 U.S.C. 154(b) by 172 days.

(21) Appl. No.: 14/168,332

(22) Filed: Jan. 30, 2014

(65) Prior Publication Data

US 2015/0211135 A1    Jul. 30, 2015

(51) Int. Cl.
  *C25C 1/02* (2006.01)
  *C25C 1/06* (2006.01)
  *C25C 5/02* (2006.01)
  *C25C 7/04* (2006.01)
  *C25C 7/00* (2006.01)
  *B01D 61/24* (2006.01)

(52) U.S. Cl.
  CPC ............... *C25C 1/02* (2013.01); *B01D 61/246* (2013.01); *C25C 1/06* (2013.01); *C25C 5/02* (2013.01); *C25C 7/00* (2013.01); *C25C 7/04* (2013.01)

(58) Field of Classification Search
  None
  See application file for complete search history.

(56) References Cited

U.S. PATENT DOCUMENTS

| | | | | |
|---|---|---|---|---|
| 2,829,095 | A * | 4/1958 | Oda | B01D 61/445 204/257 |
| 5,053,132 | A | 10/1991 | Sirkar | |
| 5,358,609 | A * | 10/1994 | Drackett | C25B 1/30 205/344 |
| 6,187,169 | B1 * | 2/2001 | Gernon | C25B 3/00 205/445 |
| 2011/0135565 | A1 | 6/2011 | Bingham et al. | |
| 2013/0146476 | A1 | 6/2013 | Chon et al. | |
| 2013/0233720 | A1 * | 9/2013 | Martoyan | C25C 5/02 205/341 |

* cited by examiner

*Primary Examiner* — Harry D Wilkins, III
(74) *Attorney, Agent, or Firm* — Pauley Erickson & Kottis (57) ABSTRACT

An electrochemical process for the production of light metals, particularly aluminum. Such a process involves contacting a light metal source material with an inorganic acid to form a solution containing the light metal ions in high concentration. The solution is fed to an electrochemical reactor assembly having an anode side containing an anode and a cathode side containing a cathode, with anode side and the cathode side separated by a bipolar membrane, with the solution being fed to the anode side. Light metal ions are electrochemically transferred through the bipolar membrane to the cathode side. The process further involves reducing the light metal ions to light metal powder. An associated processing system is also provided.

19 Claims, 5 Drawing Sheets

Schematic presentation of liquid-liquid extraction

LIGHT METAL PRODUCTION

This invention was made with government support under grant DE-AR000049 awarded by the Department of Energy. The government has certain rights in the invention.

BACKGROUND OF THE INVENTION

Field of the Invention

This invention relates generally to metal production and, more particularly, to an electrochemical process useful for producing light metal powders.

Primary aluminum is commonly produced in smelters via the Hall-Heroult (H-H) process using alumina from bauxite ore. The ore is first dissolved in caustic soda and alumina is separated from red mud residue by precipitation and filtration. The alumina precipitate is gibbsite, a form of alumina hydrate. The hydrate is calcined in a furnace to form anhydrous aluminum oxide powder before it is fed to a smelter. In the smelter, alumina ($Al_2O_3$) is dissolved in fused $NaF$—$AlF_3$ (cryolite) followed by direct current electrolysis at around 950° C., in which $CO_2$ is discharged by a sacrificial carbon anode while molten Al settles at the bottom of the cell cathode. The chemical equation is:

$$2Al_2O_3 + 3C \rightarrow 4Al + 3CO_2$$

The molten metal is siphoned out of the container to a vacuum furnace such as where it is cast into ingots for further processing.

The aluminum industry has invested enormous resources in reducing emissions from their production plants. Pollution has been slashed by nearly 80 per cent during the past 20 years. Thus, today's modern electrolytic reduction plants typically present significantly lessened environmental issues. The H-H technology, however, has been overshadowed by major issues concerning electricity supply, reliability, and cost that typically extend beyond the control of the aluminum industry. For example, such processing is highly energy-intensive. Roughly 14-15 kWh are required to produce one kg of pure aluminum. Advancements in energy efficiency have been steady, but slow. Today, the best cells typically operate at less than 13 kWh/kg and most U.S. production operates at 95 percent current efficiency. With this relatively high efficiency, long-range research efforts have focused on advanced electrode systems that promise to reduce the anode-cathode distance (the major component of ohmic resistance) and thereby improve the overall cell energy efficiency.

The H-H process commonly employs alumina from bauxite. Guinea, Australia, Jamaica and Brazil together represent approximately 70% of world's known bauxite reserves. Although Europe and North America are the world's largest producers of Al, they contain scant bauxite reserves. Europe and North America do, however, have vast quantities of anorthosite deposits, which is another type of aluminum ore chemically represented as $CaAl_2Si_2O_8$. The approximate composition of such aluminum ore is: 50% $SiO_2$, 30% $Al_2O_3$, 14% CaO, 3% $Na_2O$, 1% $Fe_2O_3$, and traces of other metal oxides such as MgO, $K_2O$, and $TiO_2$, for example. Anorthosite is found in the Nordic Region of Europe, Greenland, Canada and the eastern regions of the United States. In an effort to better balance supply and demand for bauxite in Europe, Norway has embarked on processing its own anorthosite to produce alumina. Hudson Resources also has a similar project in the White Mountain region of Greenland. Anorthosite is processed by dissolving the ore in acid. 95% of the ore is said to dissolve in hours. The residue is $SiO_2$ and the leachate contains mainly $Al^{3+}$ and $Ca^+$, $CaCO_3$ is precipitated by $CO_2$. It is frequently or commonly used in the paper and plastics industries and can be marketed to these industries. A key issue with the anorthosite process is the cost related to recycling the acid solvent.

According to a report by the US Department of the Interior, worldwide aluminum production was 45.3 Mt in 2006 and is expected to grow to 61 Mt in 2015 and to 120 Mt by 2025.

In view of the above, there is a continuing and growing interest in the development of new and improved processing techniques and equipment that reduce or minimize, if not overcome, one or more of the difficulties discussed above, such as relating to cost, environment, feed availability, etc.

SUMMARY OF THE INVENTION

A general object of the invention is to provide improved processes and systems for metal production and, more specifically for the production of light metals such as aluminum, magnesium and titanium, for example.

A more specific objective of the invention is to overcome one or more of the problems described above.

The general object of the invention can be attained, at least in part, through a specific electrochemical process for light metal production. In one particular embodiment such a process involves contacting a light metal source material with an inorganic acid to form a solution containing the light metal ions in high concentration. Such solution is fed to an electrochemical reactor assembly having an anode side containing an anode and a cathode side containing a cathode. The anode side and the cathode side are preferably separated by a bipolar membrane, with the solution being fed to the anode side. At least a portion of the light metal ions are electrochemically transferred through the bipolar membrane to the cathode side. The process further involves reducing the light metal ions to light metal powder.

In accordance with another aspect there is provided a continuous dual electrolyte extraction electro-refinery method for producing aluminum powder. In one embodiment, such a method involves contacting an aluminum metal source material with an inorganic acid to form a solution containing aluminum ions in high concentration. The solution is fed to an electrochemical reactor assembly having an anode side containing an anode and a cathode side containing a cathode. In the electrochemical reactor assembly, the anode side and the cathode side are separated by a bipolar membrane and with the solution being fed to the anode side. The method further involves electrochemically transferring at least a portion of the aluminum ions through the bipolar membrane to the cathode side. The aluminum ions are subsequently reduced to aluminum powder. The aluminum powder is transported via a carrier fluid to a separation device wherein the aluminum powder is separated from the carrier fluid. At least a portion of the separated carrier fluid is subsequently appropriately recycled to the electrochemical reactor assembly.

In accordance with another aspect of the invention, there is provided a dual electrolyte extraction electro-refinery system useful in a process for light metal production. In one embodiment, such a system includes an acid digester wherein a light metal source material contacts an inorganic acid to form a solution containing light metal ions in high concentration. The system further includes a reactor housing having an anode inlet wherethrough at least a portion of the solution can be introduced. The reactor housing contains an anode with a built-in anode electrolyte flow field and a cathode with a built-in cathode electrolyte flow field. The anode and the cathode are separated by a bipolar membrane. The bipolar membrane is preferably hydrophilic on the anode side and hydrophobic on the cathode side. The bipolar membrane permits electrochemical transfer of at least a portion of the light metal ions therethrough to the cathode side whereat the light metal ions are reduced to light metal powder. The reactor housing also includes a cathode outlet wherethrough the light metal powder in a carrier fluid can be released. The system further includes a filter to separate the light metal powder from the carrier fluid released from the reactor housing.

BRIEF DESCRIPTION OF THE DRAWINGS

These and other objects and features of this invention will be better understood from the following detailed description taken in conjunction with the drawings, wherein.

DESCRIPTION OF PREFERRED EMBODIMENTS

Figure 1:
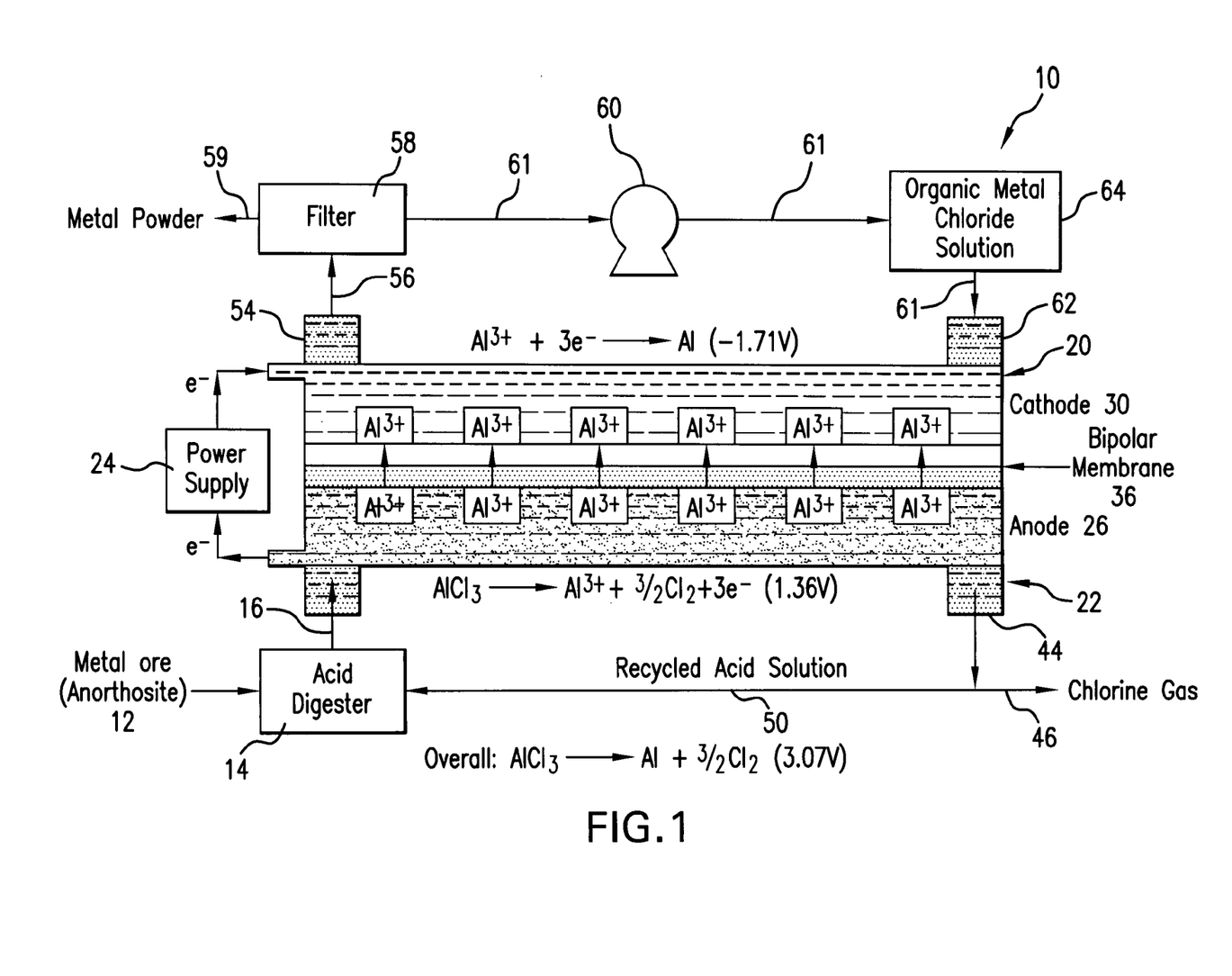
FIG. 1 is a simplified schematic diagram of a system useful in a process for light metal production in accordance with one embodiment of the invention.

Turning to FIG. 1, there is illustrated a simplified schematic diagram of a processing system, generally designated by the reference numeral 10, for light metal production in accordance with one embodiment of the invention The processing system 10 will be more specifically discussed and described below making specific reference to processing in connection with production of the light metal aluminum. It is to be understood and appreciated, however, that the invention has applicability to the processing of other materials including other light metals including magnesium and titanium, for example. As will be appreciated by those skilled in the art and guided by the teaching herein provided, although the process has applicability to the production of other various light metals as well as to the sorting out of different metals from a mixed metal solution, the discussion herein largely focuses on Al production, where it is believed that the process can make the biggest near term impact.

As detailed further below, the processing system 10 is an unconventional electrochemical process, sometimes subsequently referred to herein as a dual electrolyte extraction electro-refinery (DEEE) process or method, that can desirably serve to continuously produce aluminum metal powders at near room temperature. The DEEE process innovatively applies the principle of organic/inorganic solvent extraction with the aid of electro-osmotic drag in an electrolyzer cell to produce metals efficiently and cost effectively.

As shown in FIG. 1, a light metal source material 12, e.g., a metal ore such as an aluminum ore such as anorthosite, is introduced into an acid digester 14 wherein the metal ore is dissolved in an inorganic acid (for example, HCl) to form a solution containing the light metal ions in high concentration.

Figure 2:
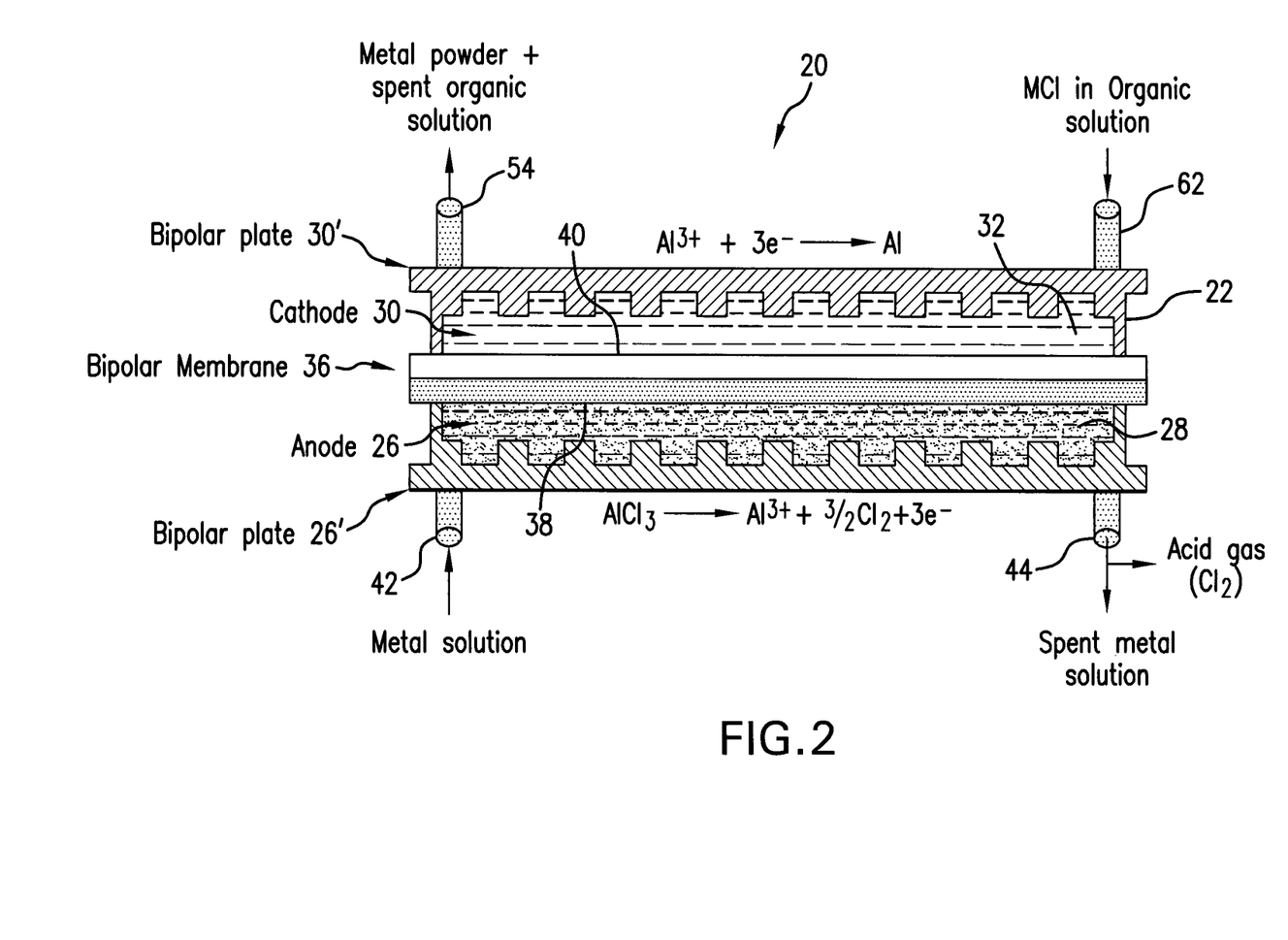
FIG. 2 is a simplified schematic diagram of an electrochemical reactor assembly in accordance with one embodiment of the invention.

The solution containing the light metal ions in high concentration is introduced via a process line 16 into an electrochemical reactor assembly 20, more specifically shown in FIG. 2 and sometimes referred to as an electrolyzer cell. The electrochemical reactor assembly 20 includes a housing, generally designated by the reference numeral 22. The housing 22 is operatively connected with a power supply, generally designated by the reference numeral 24.

Turning to FIG. 2, the reactor housing 22 contains an anode 26 with a built-in anode electrolyte flow field 28 and a cathode 30 with a built-in cathode electrolyte flow field 32 for a cathode electrolyte, typically an organic solvent which, as described in the greater detail below, serves as a medium for the reduction of $Al^{3+}$ to Al. The anode 26 and the cathode 30 are separated by a bipolar membrane 36. The bipolar membrane 36 is desirably hydrophilic on the anode side 38 and hydrophobic on the cathode side 40.

The reactor housing 22 has an anode inlet 42 wherethrough at least a portion of the solution containing light metal ions in high concentration can be introduced. As will be appreciated by those skilled in the art and guided by the teachings herein provided, the processing system advantageously permits the solution to be continuously fed to the anode side of the electrochemical cell.

The $Al^{3+}$ ions in the salt migrate through the membrane 36 to the cathode 30 while the acid anion is oxidized to a gas (e.g., $Cl_2$). The anode 26 includes one or more outlets 44 wherethrough chlorine gas and/or spent liquor (e.g., acid solution) can be removed, such as with chlorine gas recovered and conveyed via a process line 46 and acid solution recycled to the acid digested 14 via a process line 50, such as shown in FIG. 1.

The bipolar membrane 36 permits electrochemical transfer of at least a portion of the light metal ions therethrough to the cathode side whereat the light metal ions are reduced to light metal powder. That is, the dissolved $Al^{3+}$ ions from the acidic aqueous solution are transferred by conduction through the membrane 36 to an organic solvent and, upon acceptance of electrons from the electrical circuit, $Al^{3+}$ is reduced to Al powder.

The reactor housing 22 includes a cathode outlet 54 wherethrough the light metal powder in a carrier fluid can be released such as via a process line 56 and passed to a filter assembly 58 whereat the metal powder is separated from the organic solvent. The metal powder is recovered via a process line 59. The organic solvent is recycled via a pump 60 and process line 61 to a cathode inlet 62 of the reactor assembly 20. Fresh or added organic solvent can be added via an in-line supply source 64, if desired.

As aluminum cannot generally or easily be electrodeposited from aqueous solutions, for the cathode, the organic solvent desirably is not miscible with water. In view thereof, in accordance with one preferred embodiment, suitable solvents for use in the practice of the invention desirably include dioctyl ether, which is not soluble in water. If desired, other additives such as to increase the organic solvent conductivity can be included. Suitable such other materials can include dimethyl carbonate, ethylamine, and other amine related ionic liquids, for example.

The cell or reactor assembly 20 has the membrane 26 sandwiched between an anode plate 26' and a cathode plate 30'. In accordance with one preferred embodiment, the cathode and anode plates have built-in flow fields to uniformly distribute electrolytes over the entire active cell area. The edges of the plates are framed against the membrane to seal the electrolytes from the external atmosphere. As described above, the membrane 36 is bipolar. It is hydrophilic on the aqueous anolyte side but hydrophobic on the organic catholyte side so that both electrolytes wet the membrane surface and facilitate reactions. The interface between the organic/aqueous phases mimics that of liquid ionic/water ion transportation. As described in greater detail below, the cathode side plate is desirably especially designed so that the metal is produced as powder for easy harvesting. The metal is not plated onto the cathode electrode.

Figure 5:
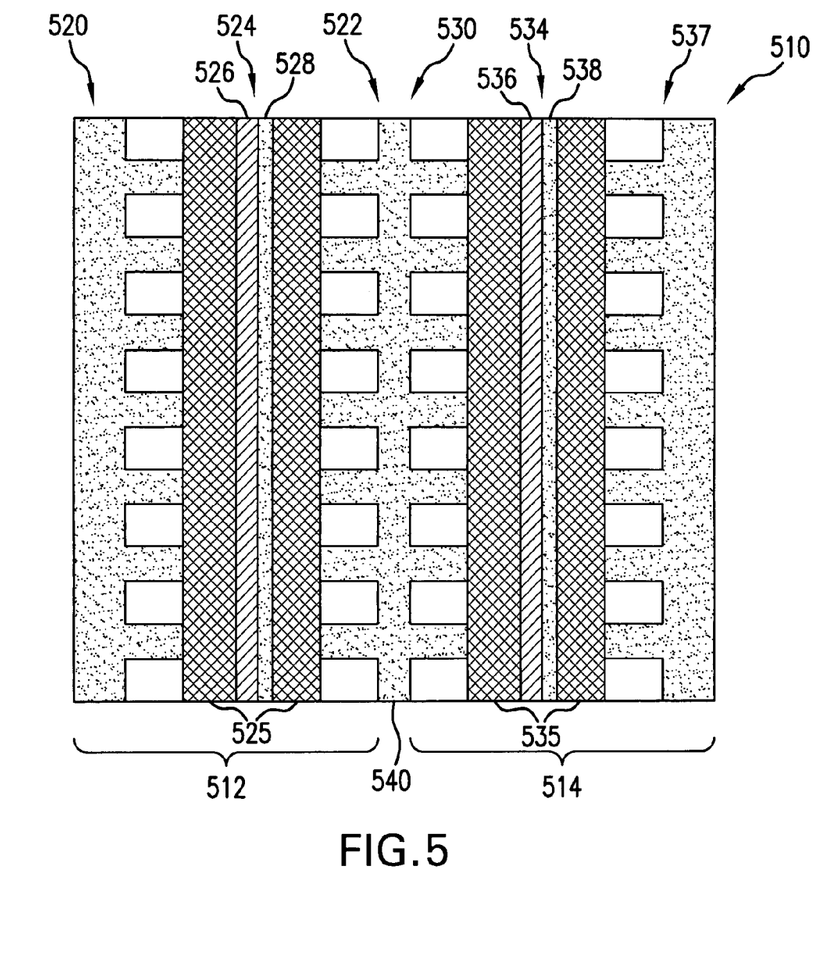
FIG. 5 is a simplified schematic diagram of an electrochemical cell stack assembly in accordance with one embodiment of the invention.

To build a multiple cell reactor, the cells can desirably be stacked. Turning to FIG. 5, there is illustrated an electrochemical cell stack assembly, generally designated by the reference numeral 510 in accordance with one embodiment of the invention. The cell stack assembly 510 includes adjacent cells 512 and 514. The cell 512 includes an anode 520 and a cathode 522 with a bipolar membrane 524 disposed therebetween. If desired, and as shown, a support mesh 525 can be interposed between bipolar membrane 524 and either or both the anode 520 and the cathode 522. Similar to the bipolar membrane 36 described above, the bipolar membrane 524 is desirably hydrophilic on the anode side 526 and hydrophobic on the cathode side 528. The cell 514 similarly includes an anode 530 and a cathode 532 with a bipolar membrane 534 disposed therebetween. Again, if desired, and as shown, a support mesh 535 can be interposed between bipolar membrane 534 and either or both the anode 530 and the cathode 532. The bipolar membrane 534 is desirably hydrophilic on the anode side 536 and hydrophobic on the cathode side 538.

In the electrochemical cell stack assembly 510, the adjacent cells 512 and 514 share a bipolar plate 540. The bipolar plate 540 serves as the cathode 522 (for the cell 512) on one side and the anode 530 (for the cell 514) on the other side. In such embodiment, the bipolar plate 540 is therefore a combination of an anode plate and a cathode plate.

As will be appreciated, electrochemical cell stack assemblies in accordance with the invention can desirably include any selected plurality of such stacked cells as may be desired for a specific or particular application.

In accordance with one aspect, the invention involves metal separation by liquid-liquid extraction. Liquid-liquid extraction is a generic separation technique for extracting dissolved ions from an aqueous solution by another solvent that is immiscible with the former and that provides high solubility to the ions. Such a liquid-liquid extraction process is illustrated by the diagram shown in FIG. 3. Species A is initially dissolved in solvent C and solvent B is initially free of species A. When solvents B and C are mixed together, species A transfers from solvent C to solvent B because of its higher solubility in or higher reactivity with solvent B. Upon settling, most of species A is captured by solvent B and can then be separated from solvent B by suitable means such as filtration in the case where species A is a solid. Such liquid-liquid extraction can simply be performed in laboratories using a separation funnel to obtain a pure metal compound.

Figure 3:
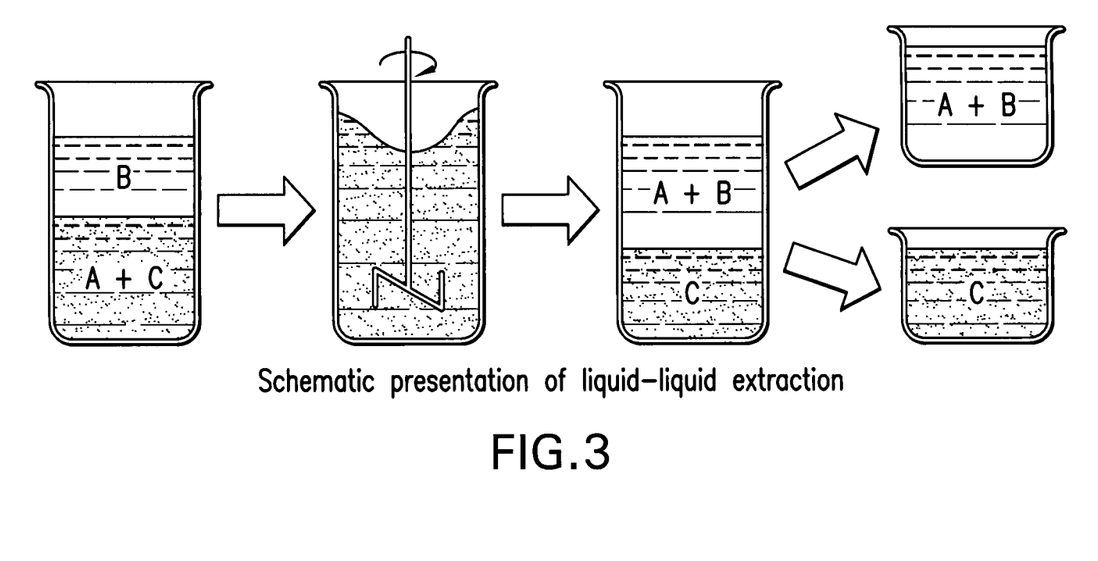
FIG. 3 is a simplified schematic representation of a conventional form of liquid-liquid extraction.

The liquid-liquid extraction process preferably employed in practice of the invention, however, deviates from the conventional practice. For example, rather than the liquids being in physical contact with each other, they are instead separated by a membrane, which in the process herein described only conducts $Al^{3+}$ ions from the acidic aqueous solution to the organic extractant. Furthermore, the transferred species in the extractant liquid are precipitated by electrochemical reduction instead of chemical solubility. The invention desirably applies the principle of organic/inorganic solvent extraction with the aid of electro-osmotic drag in an electrolyzer cell.

Those skilled in the art and guided by the teaching herein provided will appreciate that the DEEE process herein described and/or provided can advantageously avoid or eliminate various of the problems or obstacles associated with the production of primary aluminum via conventional processing such as via the H-H process. Thus, processing in accordance with can, at least in certain preferred embodiments, produce, result or offer some or all of the following several technological advantages:

1. Ore issues—If bauxite ore is used, it is dissolved in acid and is ready to use once impurities are removed. Calcination is not necessary for an energy cost saving of about 15%. Moreover, the process n ay have particular applicability in connection with the treatment or processing of anorthosite ore because of its synergy with the acid treatment of the ore. As noted above, anorthosite is the major form of alumina ore in the United States. Therefore, its utilization can contribute towards the reduction of US trade deficit. The residue from Anorthosite is $SiO_2$, which is environmentally safe. Another by-product from the ore is $CaCO_3$, which can be utilized by the paper and plastic industries. The acid solvent, such as HCl or HBr, for example, is converted to halide gas, which can be either sold as chemical or chemically converted to acid for continuous use in the DEEE process.

2. Sacrificial Carbon Electrode and $CO_2$ Emission—The DEEE process does not have a sacrificial electrode and, therefore, has no related $CO_2$ emission. Thus, carbon plates such as may be used in the practice of the invention can be expected to last for the entire duration of the target life of the reactor, e.g., 10 years or more.

3. Temperature of Operation—DEEE process operates near room temperature and uses low temperature processed materials such as polymers and extruded graphite. High temperature materials and hardware for the H-H process are processed at high temperatures at higher costs. Low temperature operation, as in the DEEE process also allows longer life.

4. Reactor Design—Both H-H and DEEE are electrolytic processes but differ significantly in reactor design. DEEE process cells are bipolar, and are stacked together. Adjacent cells share a bipolar plate, which serves as anode on one side and cathode on the other side. Cells in a stack draw electrolyte feed from one common line and exhaust product to another common line. H-H process cells are monopolar and are arranged side-by-side. Each cell has its own anode and cathode plates, alumina powder feed, carbon replenishment, and molten Al withdrawal port. DEEE process reactors, therefore, have a simpler configuration and have a considerably fewer number of parts.

The construction of the electrochemical cell and the innovative design of cell components are keys to the achieving the desired performance. The membrane separator, which separates the anolyte and the catholyte of a cell, is a non-porous ionic conductor that only allows the $Al^{3+}$ ions to pass through while keeping the electrolytes in both sides separated. The membrane can have a conductivity in a range or of 0.9 mS/cm. This conductivity can be further improved by simply reducing the thickness of the membrane. As noted above, the membrane is desirably bipolar, being hydrophilic on the anode side and hydrophobic in the cathode side so that it is readily wetted by the aqueous anolyte and the organic catholyte. Wetting can be critical to facilitate aluminum ion transfer. Other desired membrane properties include good mechanical strength and pore-free structure. The membrane material is desirably chemically stable against the electrolyte and the electrodes under the strongly reductive and oxidative environments and with organic/inorganic dual solvents. The organic solvent is selected based on its chemical stability. In aluminum processing, the membrane preferably must also dissolve $Al^{3+}$ ions and be safe to use. Ethyl carbonate/dimethyl carbonate mixtures are good candidates and are well known to be stable in Li-ion batteries. The stability of a wide variety of organic solvents is well known in the literature from electrochemical research over the past decades. This makes solvent selection relatively easy.

Figure 4:
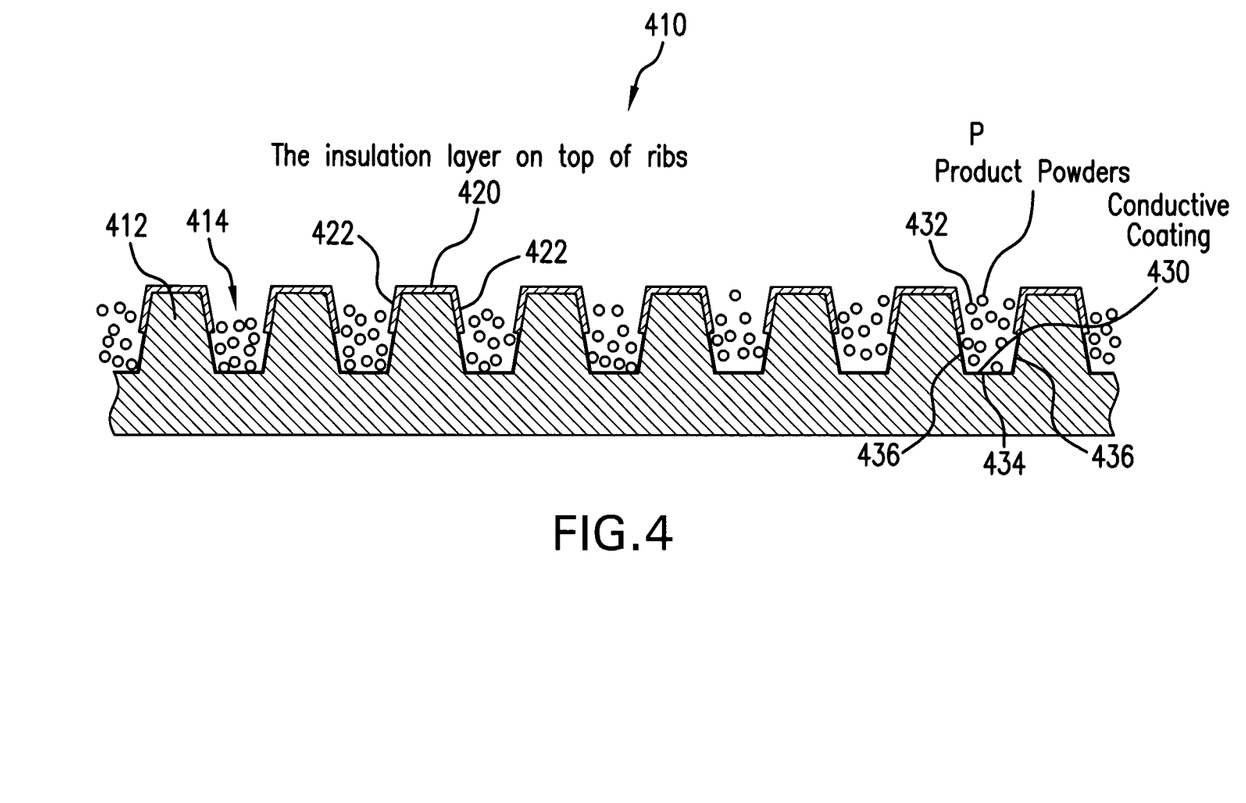
FIG. 4 is a simplified cross sectional fragmentary schematic showing a corrugated cathode in accordance with one embodiment of the invention.

In accordance with one preferred embodiment, the bipolar separator plate, which separates adjacent cells from each other, preferably has a cathode side designed so that Al metal is produced in powder form that is easily flushed out and harvested. FIG. 4 is a simplified cross sectional fragmentary schematic showing a cathode, generally designated by the reference numeral 410 in accordance with one embodiment of the invention. The cathode 410 has a corrugated configuration such as includes a plurality of longitudinally spaced apart ribs 412 such as form or otherwise appropriately provide a flow channel 414 between pairs of adjacent ribs 412. As shown, the cathode 410 can desirably include or provide a plurality of such flow channels 414. Products powders P are shown disposed in the flow channels 414.

One or more of the ribs 412 can desirably be provided with an insulation layer 420 such as of polyethylene, polypropylene, polyimide, teflon, etc., for example, at the top of rib 412. As shown, one or more portions 422 of such an insulation layer 420 can be disposed adjacent the flow channel 414 along the sides of the ribs 412 adjacent or immediately adjacent the top of the rib. In accordance with one preferred embodiment, each of the ribs 412 is provided with such an insulation layer 420.

The flow channel 414 between adjacent ribs 412 can, if desired, include a conductive coating 430 such as powders of graphite, carbon, copper, nickel, stainless steel, etc., for example. As shown, at least a portion 432 of such conductive coating 430 can be disposed on the bottom of the flow channel such as along the generally horizontally planar cathode surface 434 between adjacent ribs 412. As shown, one or more portions 436 of the conductive coating 430 can be disposed adjacent the flow channel 414 along the sides of the ribs 412 adjacent the bottom of the flow channel. e.g., such as immediately adjacent the generally horizontally planar cathode surface 434.

Thus, in accordance with one aspect of the invention, such a design, such as wherein the cathode is corrugated and the surface that is most susceptible to plating is coated with an insulating film, desirably avoids or prevents metal plating on the electrode surface as is common with metal electrolysis.

As will be appreciated by those skilled in the art and guided by the teachings herein provided, the invention also desirably provides improved processes and systems for metal production and, more specifically for the production of light metals such as aluminum, magnesium and titanium, for example. Further, particular aspects of the invention concern new and improved processing techniques and equipment that reduce or minimize, if not overcome, one or more of the difficulties discussed above, such as relating to cost, environment, feed availability, etc.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. An electrochemical process for light metal production, the process comprising:
    contacting a light metal source material with an inorganic acid to form a solution containing the light metal ions in high concentration;
    feeding the solution to an electrochemical reactor assembly having an anode side containing an anode and a cathode side containing a cathode, the anode side and the cathode side separated by a membrane that is hydrophilic on the anode side, hydrophobic on the cathode side and conductive for light metal cations and with the solution being fed to the anode side;
    electrochemically transferring at least a portion of the light metal ions through the membrane to the cathode side; and
    reducing the light metal ions to light metal powder.

2. The electrochemical process of claim 1 wherein the light metal is selected from the group consisting of aluminum, magnesium and titanium.

3. The electrochemical process of claim 1 wherein the light metal is aluminum.

4. The electrochemical process of claim 1 wherein the inorganic acid is HCl.

5. The electrochemical process of claim 1 additionally comprising:
    transporting the metal powder via a carrier fluid to a separation device; and
    separating the metal powder from the carrier fluid.

6. The electrochemical process of claim 5 additionally comprising:
    recycling at least a portion of the separated carrier fluid to the electrochemical reactor assembly.

7. The electrochemical process of claim 5 wherein the carrier fluid is an organic solution.

8. The electrochemical process of claim 7 wherein the carrier fluid comprises dioctyl ether.

9. The electrochemical process of claim 1 wherein the light metal source material is selected from the group consisting of metal scrap, metal ore or combinations thereof.

10. The electrochemical process of claim 1 wherein said process is operated on a continuous basis.

11. The electrochemical process of claim 1 wherein said process is operated at room temperature.

12. A continuous dual electrolyte extraction electro-refinery method for producing aluminum powder, the method comprising:
    contacting an aluminum metal source material with an inorganic acid to form a solution containing aluminum ions in high concentration;
    feeding the solution to an electrochemical reactor assembly having an anode side containing an anode and a cathode side containing a cathode, the anode side and the cathode side separated by a membrane that is hydrophilic on the anode side, hydrophobic on the cathode side and conductive for light metal cations and with the solution being fed to the anode side;
    electrochemically transferring at least a portion of the aluminum ions through the membrane to the cathode side;
    reducing the aluminum ions to aluminum powder;
    transporting the aluminum powder via a carrier fluid to a separation device;
    separating the aluminum powder from the carrier fluid; and
    recycling at least a portion of the separated carrier fluid to the electrochemical reactor assembly.

13. The continuous dual electrolyte extraction electro refinery method for producing aluminum powder of claim 12 wherein the inorganic acid is HCl.

14. The continuous dual electrolyte extraction electro refinery method for producing aluminum powder of claim 12 wherein the carrier fluid is an organic solution.

15. The continuous dual electrolyte extraction electro refinery method for producing aluminum powder of claim 14 wherein the carrier fluid comprises dioctyl ether.

16. The continuous dual electrolyte extraction electro refinery method for producing aluminum powder of claim 12 wherein the light metal source material is selected from the group consisting of metal scrap, metal ore or combinations thereof.

17. The continuous dual electrolyte extraction electro refinery method for producing aluminum powder of claim 12 wherein said process is operated at room temperature.

18. A dual electrolyte extraction electro-refinery system useful in a process for light metal production, the system comprising:

an acid digester wherein a light metal source material contacts an inorganic acid to form a solution containing light metal ions in high concentration;

a reactor housing having an anode inlet wherethrough at least a portion of the solution can be introduced, the reactor housing containing an anode with a built-in anode electrolyte flow field and a cathode with a built-in cathode electrolyte flow field, the anode and the cathode separated by a membrane, the membrane being hydrophilic on the anode side and hydrophobic on the cathode side, the membrane permitting electrochemical transfer of at least a portion of the light metal ions therethrough to the cathode side whereat the light metal ions are reduced to light metal powder, the reactor housing also including a cathode outlet wherethrough the light metal powder in a carrier fluid can be released; and a filter to separate the light metal powder from the carrier fluid released from the reactor housing.

19. The dual electrolyte extraction electro-refinery system of claim 18 wherein the membrane is non-porous and an ion conductor.

* * * * *